(12) United States Patent
Meng et al.

(10) Patent No.: US 8,130,134 B2
(45) Date of Patent: Mar. 6, 2012

(54) REDUCED INSTRUCTION SET TELEVISION CONTROL SYSTEM AND METHOD OF USE

(75) Inventors: Bojun Meng, Hong Kong (HK); Yeaun Jau Liou, Hong Kong (HK)

(73) Assignee: Hong Kong Applied Science and Technology Research Institute Company Limited, New Territories, Hong Kong (CN)

(*) Notice: Subject to any disclaimer, the term of this patent is extended or adjusted under 35 U.S.C. 154(b) by 610 days.

(21) Appl. No.: 12/349,263

(22) Filed: Jan. 6, 2009

(65) Prior Publication Data
US 2010/0171887 A1    Jul. 8, 2010

(51) Int. Cl.
*H04L 17/02* (2006.01)
*G09G 5/00* (2006.01)
*G06F 3/033* (2006.01)
*G09G 5/08* (2006.01)

(52) U.S. Cl. .................. 341/176; 345/156; 345/158

(58) Field of Classification Search .............. 341/176
See application file for complete search history.

(56) References Cited

U.S. PATENT DOCUMENTS

| 6,624,806 | B2 | 9/2003 | Hsu |
| 6,975,301 | B2 | 12/2005 | Fan |
| 7,239,301 | B2 | 7/2007 | Liberty et al. |
| 7,535,456 | B2* | 5/2009 | Liberty et al. ............... 345/158 |
| 2006/0184966 | A1 | 8/2006 | Hunleth et al. |
| 2008/0158154 | A1 | 7/2008 | Liberty et al. |
| 2008/0222675 | A1 | 9/2008 | Moshiri et al. |

* cited by examiner

*Primary Examiner* — Dharti Patel
(74) *Attorney, Agent, or Firm* — Ella Cheong Hong Kong; Margaret A. Burke; Sam T. Yip

(57) ABSTRACT

The claimed invention relates to an interactive television system including a controller for converting the hand motion of the user into acceleration data of three axes by a single 3-axis accelerometer 113 and an interactive system for mapping the output of the acceleration data with the pre-defined data in a motion database thereof so that the user can remotely control the TV centric devices with a reduced set of instructions. The claimed invention also relates to a method of using a controller incorporated with a single 3-axis accelerometer to control an interactive system for TV centric devices.

9 Claims, 5 Drawing Sheets

REDUCED INSTRUCTION SET TELEVISION CONTROL SYSTEM AND METHOD OF USE

TECHNICAL FIELD

The claimed invention relates to an interactive system for controlling a television centric device. More specifically, the claimed invention relates to a controller with a reduced instruction set to remotely control a number of multimedia applications in an interactive system, especially in the control of TV centric devices, such as TV set and set-top-box (STB).

SUMMARY OF INVENTION

Conventional remote control of TV centric device is usually a simple device which is configured to have one function for each button. It results in a lot of buttons such that the user needs longer time to search appropriate button on the remote control for specific function. Such kind of remote control is not in favor of user's preference and is limited by the default function of the remote control. It is also not in favor of navigation control since each button pressing can go only one step in the direction of up/down/left/right on the conventional remote control. It is even impossible to be a pointing device for all directions of a two-dimensional interface which is frequently used in TV game and movie nowadays. Although the existing technology enables the detection of hand motion of the user, such kind of technology cannot accurately detect the distance displaced by the hand motion due to the inclusion of gravity upon calculation. Other technology using gyroscope for detecting and compensating the tilting in the hand motion is costly and power-consuming.

In order to cope with the demands on quick navigation control of TV centric control as well as other multimedia application implemented with two-dimensional interface, a television control system with a reduced set of instructions is disclosed in the claimed invention.

In the first aspect of the claimed invention, it relates to a controller incorporated with a single accelerometer for sensing hand motion of the user and transmitting acceleration data to the other end of the interactive system in order for the user to control different functions in multimedia application. The controller according to the claimed invention is designed to fit the shape of human's hand. The base of the controller is designed to stand on a flat surface such that the user can either hold it on his/her hand or place it on a flat surface when using the controller. The controller is mainly composed of a main PCB board including several integrated circuit (IC) chips of the single 3-axis accelerometer, one micro control unit (MCU), and some minor chips such as power converter, and separate components such as capacitors and resistances. The IC chips of the accelerometer are the key component for sensing hand motion of the user in 3-axis (x-axis, y-axis and z-axis). The controller is also incorporated with a wireless transmitter and a wireless communication module for transmitting different types of commands/data from the controller to the receiver of the interactive system. The controller according to the claimed invention is also reduced in the number of buttons on its control panel as compared to the conventional remote control. In addition to the controller, the interactive system according to the claimed invention is also incorporated with a receiver for receiving signals transmitted from its corresponding controller(s).

In the second aspect of the claimed invention, it relates to a method of sensing the user's hand motion by the accelerometer of the controller and transmitting the motion signals from the controller to the receiver of the interactive system. The method according to the claimed invention include switching the interactive system to an appropriate mode, activating the wireless data communication between the controller and the interactive system, pressing a button on the controller to activate the accelerometer of the controller, capturing the acceleration data from the activated accelerometer by MCU, packetizing the acceleration data with the status of the buttons on the controller, transmitting packet data to interactive system through a wireless communication module.

DETAILED DESCRIPTION OF INVENTION

Figure 1:
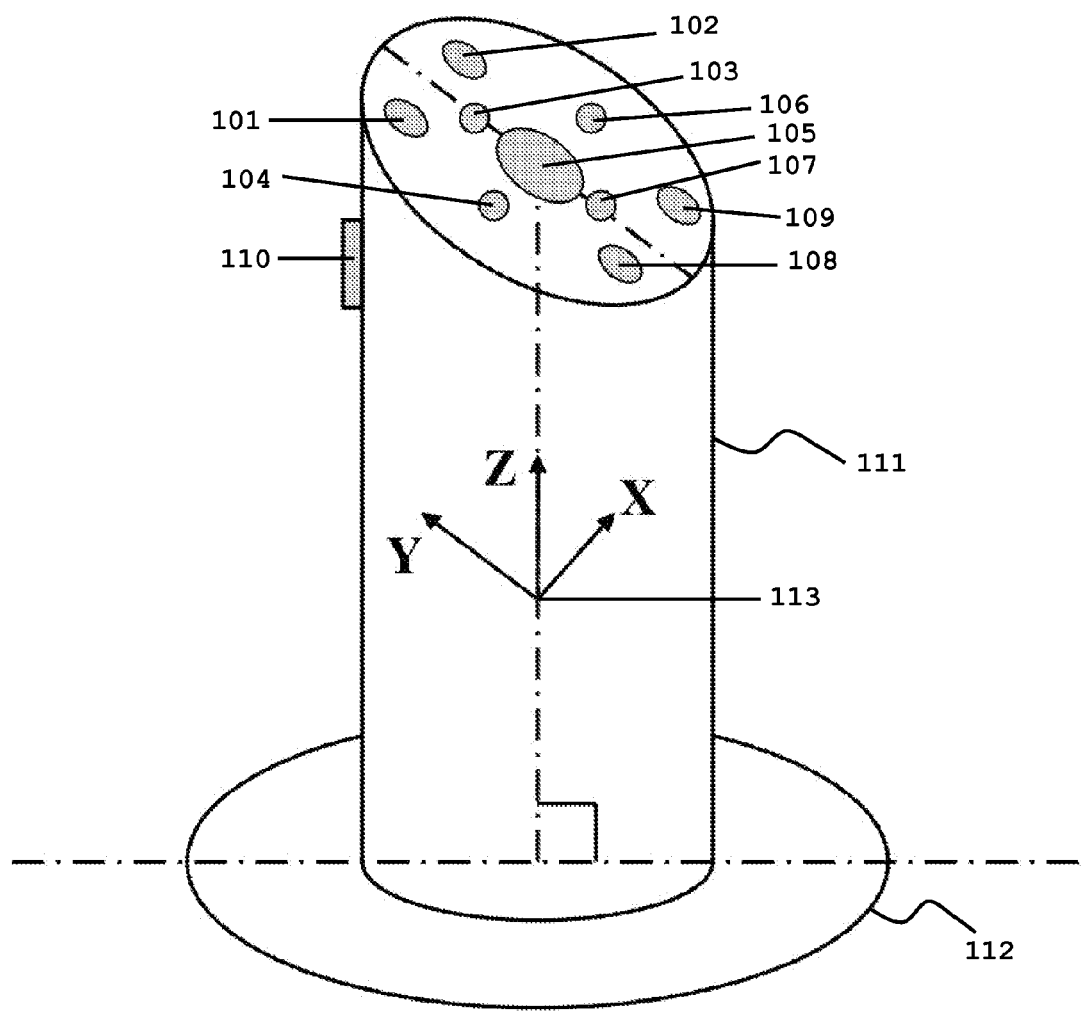
FIG. 1 is the side view of the controller according to the claimed invention. It illustrates the basic structure of the controller including a top panel, a handle and a flat base.

The basic structure of the controller is illustrated in FIG. 1.

In FIG. 1, the basic structure of the controller includes: a handle 111 with a base 112 to stand on a flat surface such as a table (not shown in FIG. 1); several buttons on the top including "Power" 101, "Mute" 102, "Up" 103, "Left" 104, "OK" 105, "Right" 106, "Down" 107, "Menu" 108, "Exit" 109; one button at the front "Func" 110; two LED lights as indexes on the top to show the power status (red, green) (not shown in FIG. 1). Inside the handle, it includes: a battery (not shown in FIG. 1) which is either rechargeable or disposable; a main PCB board (not shown in FIG. 1) including the chips of a single 3-axis accelerometer 113, one micro control unit (MCU) (not shown in FIG. 1); and some minor chips (not shown in FIG. 1) such as power converter and separate components (not shown in FIG. 1) such as capacitors and resistances; a wireless transmitter such as infrared (IR) transmitter (not shown in FIG. 1) to send commands (i.e. this transmitter will serve as the commands channel); a wireless communication module (not shown in FIG. 1) will serve as the data channel to send data in the mode selected from the group consisting of Bluetooth, IrDA, Zigbee and Amplitude Shift Keying (ASK) based RF chipset; lines (not shown in FIG. 1)

to connect main PCB with other parts (i.e., buttons, LEDs, battery, IR and wireless communication module) (not shown in FIG. 1).

In order to receive the signals/data from the controller, the other end of the interactive system according to the claimed invention is also incorporated with an IR receiver and wireless communication module for receiving different types of signals/data from the controller. The interactive system is run in an OS with mouse support.

The controller according to the claimed invention can be used as an ordinary remote control which is operated by pressing the buttons on the control panel of the controller. In one embodiment, the controller can be switched to commands channel mode. In that embodiment, the user can press the buttons on the control panel of the controller to control the functions in TV/STB including the adjustment of volume, channel selection, brightness and contrast, etc. The signals are transmitted from the controller through the IR transmitter of the controller to the other end of the interactive system.

The controller according to the claimed invention is also used as a pointing device. In one embodiment, the controller is switched to data channel mode. In that embodiment, the user initiates the data channel mode by pressing the "Func" button on the controller. The MCU of the controller detects the pressing down of "Func" button and then activates the wireless data communication between the controller and the interactive system which is incorporated with corresponding wireless module. The accelerometer in the controller is under sleep mode if "Func" button is not pressed down. When MCU detects the pressing down of "Func", the MCU also activates the accelerometer to measure acceleration for each of the three axes. During the time when "Func" is being pressed down, the MCU keeps capturing the acceleration data from accelerometer, packetizing the data with the status (pressed/released) of the buttons, and sending the packet to TV/STB through the wireless communication module. The frequency to sample the acceleration, packetize the data and sending the packet can vary from 1 to 200 Hz, preferably is from 1 to 40 Hz. An example of the packet is illustrated in the following table:

TABLE 1

|  | Acce_X | Acce_Y | Acce_Z | Button Status |  |
|---|---|---|---|---|---|

In table 1, each of the acceleration data (i.e. Acce_X, Acce_Y and Acce_Z) is about two-byte long while button status (Button_Status) is about one-byte, and the shaded area means the necessary overhead to build a packet according to a wireless communication protocol mentioned above. The length of the acceleration data and the button status data are not limited by this example and can be changed accordingly. The length of each box of table 1 is not in proportion to the size of the data or to the length of signal processing.

After receiving the packet from the controller, the other end of the interactive system maps the acceleration data to a coordination (e.g. x,y) in its virtual screen and display a cursor at that location. The interactive system also checks the button status to see whether the user has pressed down "OK" button to confirm the selection of the cursor. From the user side, when a user holds the controller vertically and presses the "Func" button, he/she can see a cursor on the center of the screen. Keeping the button pressed, the user can slowly twist his wrist left, right, forwards and backwards to control the cursor to go left, right, down and up accordingly. The user can move the cursor to point on the intended menu/item, and press "OK" on the top of the controller to confirm the desired function. Once the user release the "Func" button, the MCU then sends a packet with the new status "Func" to TV/STB, and then stop sending more data packets after a couple of seconds if no status change for "Func" (i.e. no further pressing of "Func" button). Similarly, the wireless communication module and accelerometer will be set to sleep mode after the same period of time. If TV/STB detects that "Func" button has been released from the received data, it will hide the cursor at the edge or not display the cursor any more.

Figure 2:
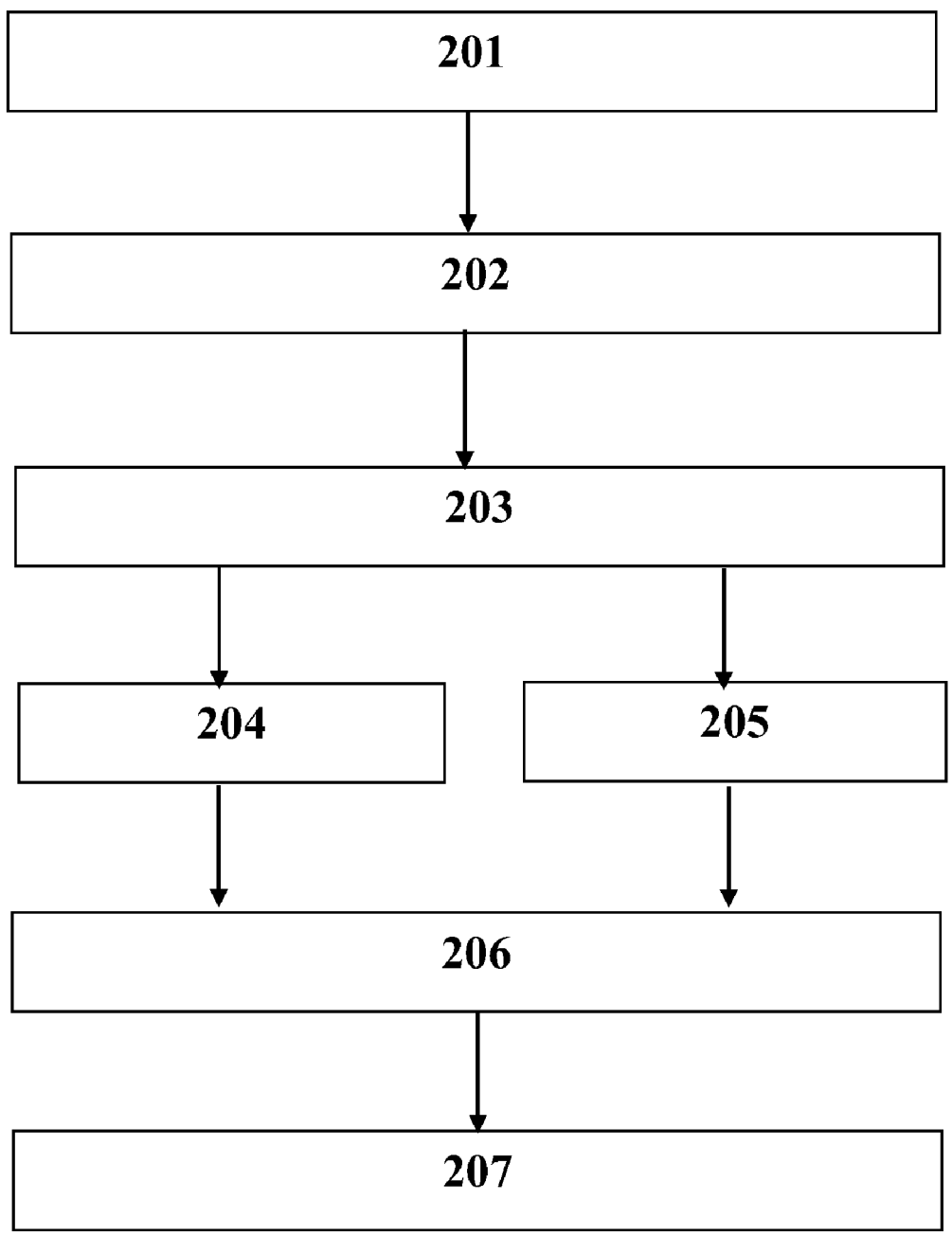
FIG. 2 is the flow diagram of the method of using the controller according to the claimed invention.

The above process of data channel mode is generalized into the following three stages and is illustrated in FIG. 2 as a flow diagram:

Initial stage: MCU of the controller detects the event from "Func" button on the controller 201, and then activates the accelerometer and the wireless communication module with TV/STB 202;

Normal stage: The controller keeps sending packet data, including acceleration data and button status data 203. On the other side of the interactive system (TV/STB), it calculates the cursor target location from the received acceleration data and displays a cursor at such position through the OS mouse interface 204. Meanwhile, the interactive system determines the button status of "OK" to see whether the user has selected an item and sends this event accordingly to the OS through mouse click interface 205;

End stage: When the user releases the "Func" button on the controller, MCU continues sending data for a couple of seconds and then sets wireless module and accelerometer to sleep mode 206. In other words, the controller does not send any data through wireless module of the controller any more. On the other side of the interactive system (TV/STB), it detects the status change of "Func" button and hides the cursor accordingly if no further data is sent from the controller 207.

Figure 3:
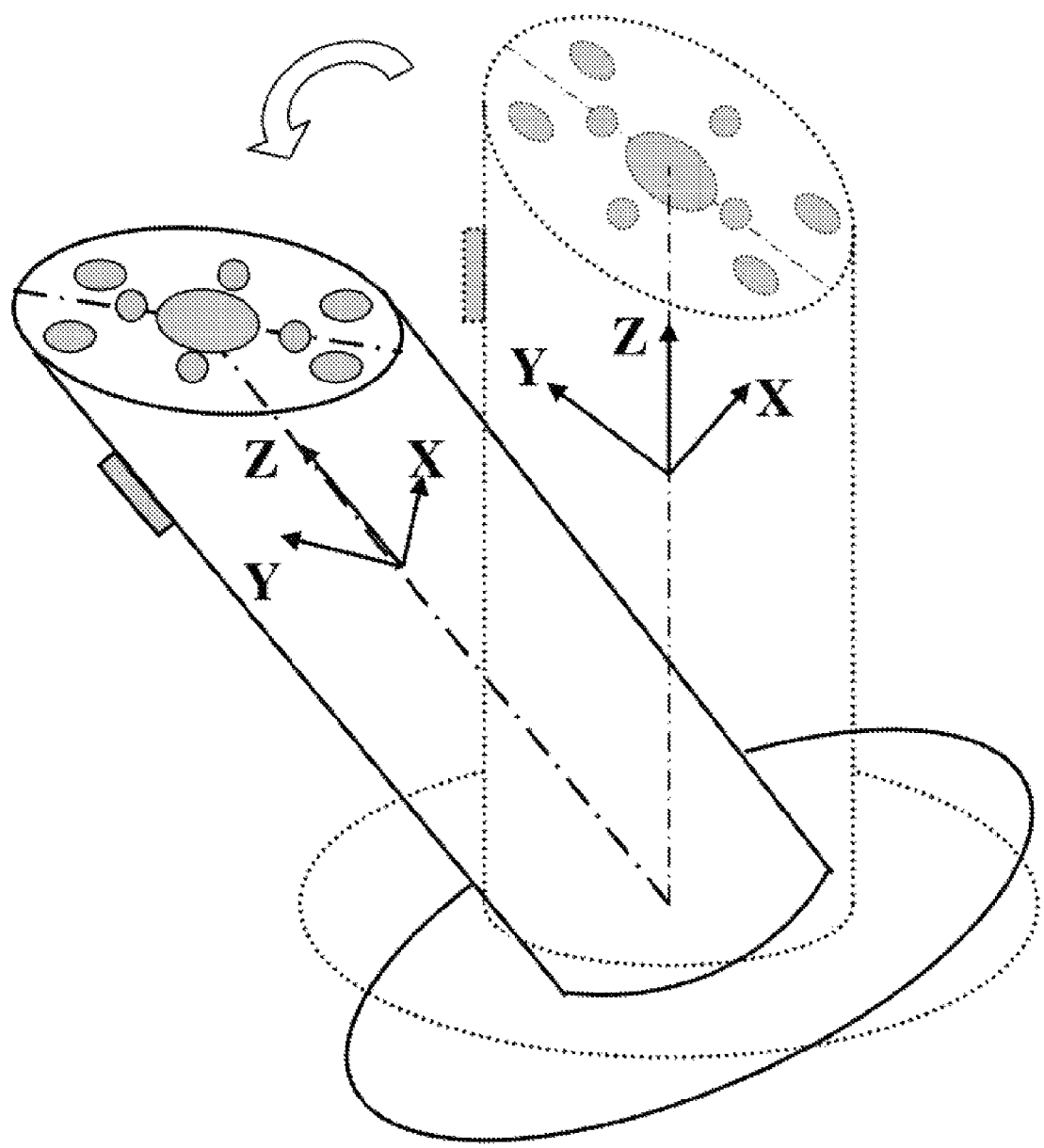
FIG. 3 is the side view of the controller when the user first grabs the controller at its vertical position and then tilts along on the X-Z plane.

FIG. 3 illustrates the change in the angle on the X-Z plane when the user tilts the controller left. The accelerometer of the controller according to the claimed invention measures accelerations for three axes at the same time. The accelerometer does not only detect the magnitude of acceleration, but also detect the direction. In one embodiment, when the output of an axis is quantized to the range of 0 to 255, then 128 means zero acceleration, and a number larger than 128 means an acceleration towards the positive direction of such axis while a number smaller than 128 means an acceleration towards the negative direction of this axis. In that embodiment, positive/negative can be defined by the manufacturer of the sensor.

The controller according to the claimed invention is switched to analog or digital sensor. When the user switches the controller to an analog sensor, the output for each axis is in a magnitude of voltage. When the user switches the controller to a digital sensor, the output for each axis is a digital number. For the analog sensor, the acceleration data (in voltages) is converted into digital through A/D converter. The acceleration in digital format will be sent through wireless module later.

Figure 4A:
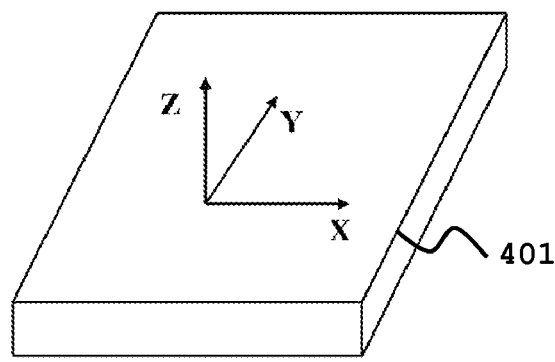
FIG. 4a is the side view of the chipset of a single 3-axis accelerometer in the controller according to the claimed invention which is at the starting position parallel to the supporting (i.e. z-axis is vertical to the ground).
Figure 4B:
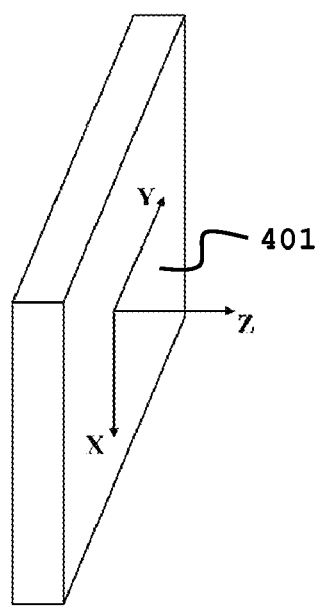
FIG. 4b is the side view of the chipset of a single 3-axis accelerometer in the controller according to the claimed invention which has been turned from the starting position as shown in FIG. 4a to the clockwise direction by 90°.
Figure 4C:
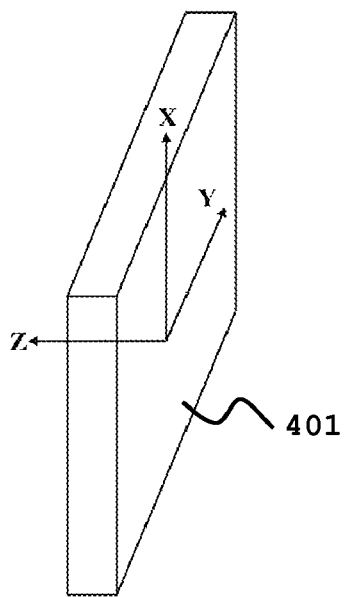
FIG. 4c is the side view of the chipset of a single 3-axis accelerometer in the controller according to the claimed invention which has been turned from the starting position as shown in FIG. 4a to the anti-clockwise direction by 90°.

In FIG. 4a, the chip of the accelerometer 401 in the controller is placed in a position parallel to the ground (i.e. z-axis is vertical to the ground). When the controller has switched to data channel mode and the MCU of the controller has activated the accelerometer, the acceleration data of x-axis, y-axis, and z-axis is being recorded with respect to the change in the angle from the starting position to the position after the hand motion (denoted as Acce_X, Acce_Y, Acce_Z respectively). In FIG. 4a, for example, assuming that the quantization range of the acceleration data for each axis is between 0 to 255 and the acceleration along x-axis is equal to zero and the acceleration along y-axis is equal to zero, then the acceleration data of each axis are Acce_x=128, Acce_Y=128, while Acce_Z=Acce_Z_1G_Negative (the acceleration data for z-axis depends on the detection range of the sensor; 1G means the 1 g acceleration from the gravity, Negative means the direction of acceleration is pointing to the reverse direction of z-axis). In FIG. 4b, when the user tilts the chip of the accelerometer in the controller 401 to the right by 90 degree in the X-Z plane (i.e. clockwise direction by 90 degree in the X-Z plane from the position of the chip as shown in FIG. 4a), then the acceleration data of each axis becomes Acce_Z=128, Acce_Y=128 and Acce_X=Acce_X_1G_Positive. In FIG. 4c, when the user tilts the chip of the accelerometer in the controller 401 left by 90 degree in the X-Z plane (i.e. anti-clockwise direction by 90 degree in the X-Z plane), then Acce_Z=128, Acce_Y=128 and Acce_X=Acce_X_1G_Negative. In one embodiment, the manufacturer defines the order of magnitude of the acceleration data as Acce_X_1G_Negative>128>Acce_X_1G_Positive. In another embodiment, the manufacturer defines the order of magnitude of acceleration data as Acce_X_1G_Negative<128<Acce_X_1G_Positive. The data resulted from the above-mentioned quantification is used to calculate the distance of the cursor displaced on the screen of the interactive system based upon the magnitude of the acceleration data. The method of calculating the displacement of the cursor on the screen of the interactive system based upon the acceleration data will be discussed later in the disclosure of the claimed invention.

Figure 5A:
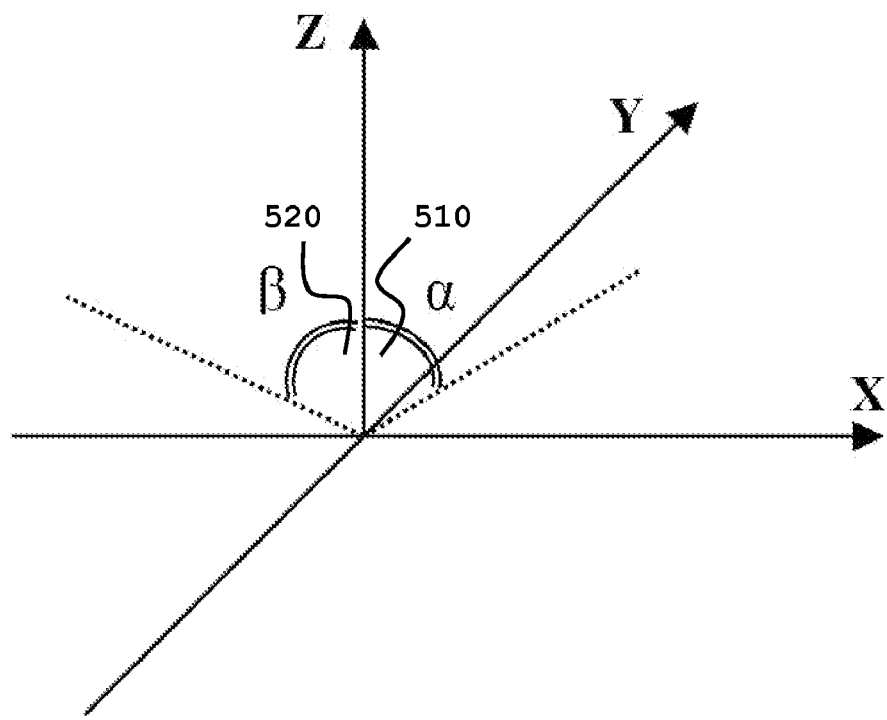
FIG. 5a is a schematic diagram showing the angles for calculating the cursor location. Alpha and Beta are threshold angles for the comfortable twisting of a human wrist in clockwise and anti-clockwise directions respectively on the X-Z plane.

FIG. 5a illustrates the limit of the angular change of the controller along x-axis. In FIG. 5a, Alpha 510 and Beta 520 represent the threshold limit of the angles between the original position of the controller lie in the z-axis and the central axis of the controller when tilting the controller clockwise and anti-clockwise respectively (i.e. tilting right and left of the controller in X-Z plane respectively). The original z-axis represents the position of the controller where the user holds the controller vertically at the beginning. Due to the limitation of human wrist, the comfortable tilting angle along the x-axis is assumed to be smaller than a certain angle, for example, Alpha 510 and Beta 520.

Figure 5B:
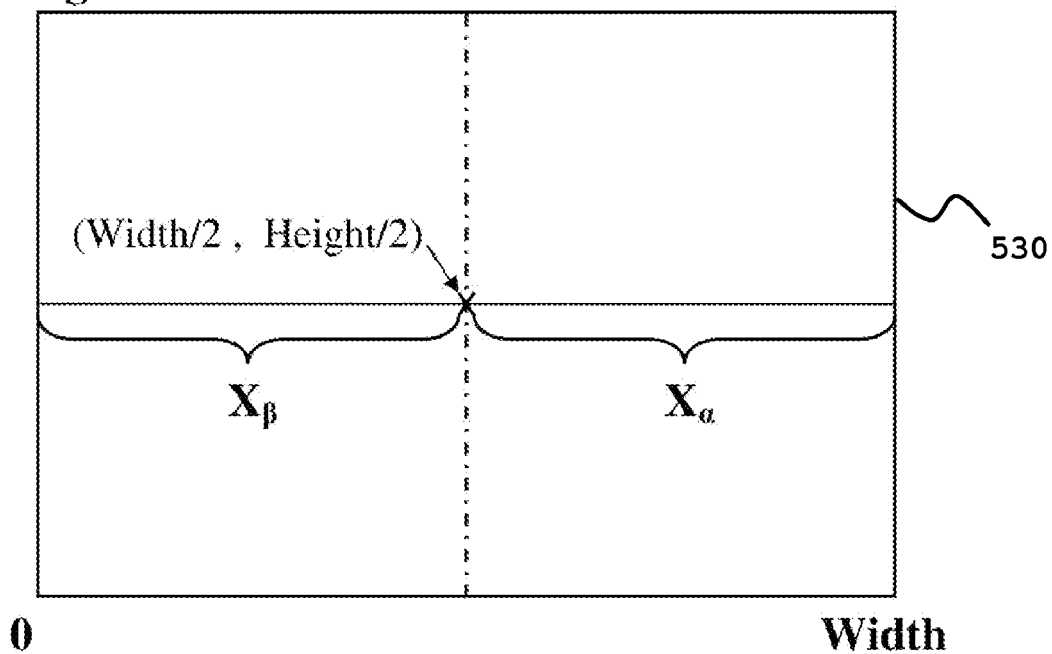
FIG. 5b is a schematic diagram showing the distance of the cursor with respect to the change in the angle about the starting cursor point by the hand motion of the user when using the controller according to the claimed invention.

FIG. 5b illustrates how the horizontal position of the cursor displaced on the graphical user interface (e.g. a screen 530) is calculated from the acceleration data generated by the controller. Provided that the angles of Alpha and Beta (not shown in FIG. 5b) are defined as the threshold limit for the controller and the measured acceleration by the sensor at Alpha is larger than that at Beta (i.e. Acce_X_Alpha>128>Acce_X_Beta), the horizontal position of the cursor (not shown in FIG. 5b) displaced on the graphical user interface 530 in FIG. 5b is calculated according to the following conditions (Cursor_X is denoted for the X coordination, i.e. horizontal position, of the cursor in this example): 1) If Acce_X=128, Cursor_X=Width/2. 2) If Acce_X≧Acce_X_Alpha, Cursor_X=Width. 3) If Acce_X>Acce_X_Beta, Cursor_X=0. 4) For Acce_X_Beta<Acce_X<128, Cursor_X=Width/2−(Width/2)*((128−Acce_X)/(128−Acce_X_Beta)). 5) For Acce_X_Alpha>Acce_X>128, Cursor_X=Width/2+(Width/2)*((Acce_X-128)/(Acce_X_Alpha-128)).

Alternatively, if the manufacturer wants the cursor to move in the same distance (i.e. the same stepsize) on the screen when tilting the same absolute angle in the design, the smaller angle between Alpha and Beta can be selected, provided that the Alpha is present and the horizontal position of the cursor on the screen is remapped by replacing Acce_X_Beta with Acce_X_Alpha according to the above conditions 1-5 in paragraph [0030]. The vertical position of the cursor displaced on the screen can also be calculated according to the above conditions 1-5 in paragraph [0030] with respect to the acceleration data along the y-axis.

While the claimed invention has been described with examples to preferred embodiments, it will be apparent that other changes and modifications could be made by one skilled in the art, without varying from the scope or spirit of the claims appended hereto.

INDUSTRIAL APPLICABILITY

The claimed invention can be applied in the control of TV centric system as well as other multimedia with a two-dimensional user interface. The claimed invention can also be used for the design of any machinery for sensing the 3-dimensional motions of the user.

What we claim:

1. An interactive television system controller comprising an ergodynamic housing incorporated with a top panel, a main PCB board having a micro control unit, a 3-axis accelerometer, a wireless transmitter, and a wireless communication module,
   wherein said controller switches to data channel mode by the micro control unit sensing a user pressing continuously a first button on the controller activating the 3-axis accelerometer and the wireless communication module,
   wherein the 3-axis accelerometer senses the user's hand motion to generate acceleration data,
   wherein the micro control unit captures the acceleration data from the 3-axis accelerometer,
   wherein the micro control unit senses the user's button selection on a second group of one or more buttons on the controller to generate button status data of the second group of one or more buttons,
   wherein the micro control unit packetizes said acceleration data with the button status data to create packetized data,
   wherein the wireless communication module transmits the packetized data to an interactive system,
   wherein the interactive system receives the packetized data,
   wherein the interactive system quantizes said acceleration data according to pre-defined configurable quantization ranges stored in the interactive system,
   wherein the interactive system displaces a cursor on a screen of the interactive system to create a new cursor position based upon magnitude of the quantized acceleration data, and
   wherein said controller switches to commands channel mode by the micro control unit sensing the user releasing the first button.

2. The interactive television system controller according to claim 1, wherein said main PCB board additionally comprises, a power converter, capacitors and resistances.

3. The interactive television system controller according to claim 1, wherein said 3 axis accelerometer additionally comprises a 3-axis acceleration data derivation chipset.

4. The interactive television system controller according to claim 1, wherein said wireless communication module is in the mode selected from a group consisting of Bluetooth, IrDA, Zigbee and Amplitude Shift Keying (ASK) based RF chipset.

5. A method of using an interactive television system controller comprising:
   switching said controller to data channel mode by a micro control unit in the controller sensing a user pressing continuously a first button on the controller activating an accelerometer and a wireless module of the controller, sensing the user's hand motion by the accelerometer in said controller generating acceleration data, capturing the acceleration data from the accelerometer by the micro control unit, sensing the user's button selection on a second group of one or more buttons by the micro control unit generating button status data of the second group of one or more buttons, packetizing said acceleration data with the button status data by the micro control unit creating packetized data, transmitting the packetized data to an interactive system through the wireless module, receiving the packetized data by the interactive system, quantizing said acceleration data according to pre-defined configurable quantization ranges stored in said interactive system, displacing a cursor on a screen of said interactive system to create a new cursor position based upon magnitude of said quantized acceleration data, and switching said controller to commands channel mode by the micro control unit sensing the user releasing the first button.

6. The method of using an interactive television system controller according to claim 5, wherein said sensing additionally comprises sensing the user's hand motion in three axes including x-axis, y-axis and z-axis simultaneously.

7. The method of using an interactive television system controller according to claim 5, wherein said packetizing and said transmitting are in a frequency between 1-200 Hz.

8. The method of using an interactive television system controller according to claim 5, wherein said acceleration data is 2 bytes.

9. The method of using an interactive television system controller according to claim 5, wherein said data of button status is 1 byte.

* * * * *